GLASS DEPOSITION
Filed Oct. 17, 1972
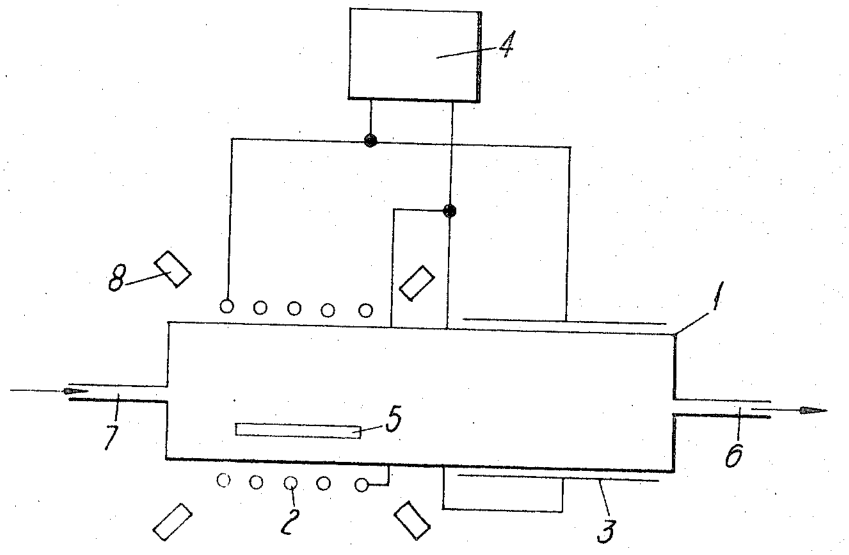

United States Patent Office 3,843,392
Patented Oct. 22, 1974

3,843,392

GLASS DEPOSITION

Henley Frank Sterling, Great Dunmow, and John Henry Alexander, Bishop's Stortford, England, assignors to ITT Industries, Inc., New York, N.Y.

Filed Oct. 17, 1972, Ser. No. 298,191
Claims priority, application Great Britain, Oct. 28, 1971, 50,082/71
Int. Cl. C03c *3/12;* C23c *11/00*
U.S. Cl. 117—93.1 GD 10 Claims

ABSTRACT OF THE DISCLOSURE

This invention relates to a method of depositing chalcogenide glass layers on a substrate for example of silicon. An RF glow discharge in a mixture of gaseous compounds each containing one of the chemical elements of the glass, preferably the hydrides, produces the energy necessary to initiate the chemical reactions to dissociate the mixed compounds.

BACKGROUND OF THE INVENTION

This invention relates to a method of forming glass layers and particularly to a method of forming layers of chalcogenide glass.

The chalcogenide glasses, which contain selenium, and/or tellurium and/or sulphur, together with other elements, particularly arsenic, and/or germanium and/or silicon, include certain compositions which are amorphous semiconductors and which have suitable properties for switching purposes. There are two types of switching behavior depending on the composition of the glass. The threshold switch for which there is a minimum value of holding current during the on-state, with a reversion to the off-state if the current falls below this value. The second type is the memory switch, in which application of a voltage above a given value for a sufficient time causes the device to assume a low resistance state which persists until a short high energy current pulse is applied whereupon the device assumes a high resistance state.

Amorphous semiconductor chalcogenide glass switches are realizable in thin-film form, and are eminently suitable for incorporation into monolithic assemblies such as solid state display or memory arrangements.

However, the conflicting physical properties of the elements in such chalcogenide glasses makes it difficult to employ conventional melting methods for bulk manufacture. Nevertheless such bulk material is necessary to provide the source or sources for the sputtering of thin films of the glass. Composition is therefore difficult to control.

SUMMARY OF THE INVENTION

It is an object of the present invention to provide a method of depositing a layer of chalcogenide glass on a surface while avoiding the disadvantages of conventional melting methods.

According to a broad aspect of the invention there is provided a method of depositing a layer of chalcogenide glass on a surface of a substrate wherein the energy necessary to promote the required chemical reactions for the formation of the layer is provided by a plasma established adjacent to said surface in an atmosphere containing a mixture of compounds each including an element of the layer.

The above stated method of the invention eliminates the need to produce bulk material with its attendant disadvantages, and gives the ability to coat much larger areas of substrate uniformly and at greater speed than would be possible without great difficulty by a sputtering operation.

BRIEF DESCRIPTION OF THE DRAWING

The above and other objects of the present invention will be better understood from the following detailed description taken in conjunction with the sole drawing the essential parts of the equipment for depositing chalcogenide glass layers.

DESCRIPTION OF THE PREFERRED EMBODIMENT

The plasma may be established by a variety of methods, but it is preferred to apply an electric field to establish the plasma, utilizing a voltage which alternates at a radio frequency.

The mixed compounds contained in the atmosphere in which the plasma is established may be selected from any suitable compounds existing in gaseous form or having a vapor pressure such that they are in vapor form at the method operating pressure, which is generally but not necessarily at a pressure below normal atmospheric pressure. The vapor may be transported into the plasma zone by a suitable carrier gas.

The chalcogenide glasses containing selenium, tellurium, arsenic, germanium and silicon have a common factor in that each of these elements has a gaseous covalent hydride which can be decomposed in plasma, and it is therefore preferred to use a mixture of these gaseous hydrides.

The substrate on which the chalcogenide glass layer is deposited may be selected from a wide range of materials. Where it is desired to deposit the layer for the switching purposes already mentioned, the substrate is preferably of silicon which already contains semiconductor elements to be associated with the layer for control or utilization of the switching.

Embodiments of the invention will now be described with reference to the single figure of the accompanying drawing, which shows essential parts of equipment for depositing chalcogenide glass layers.

A reaction chamber 1 of dielectric (quartz) material is surrounded over one part of its length by an induction coil 2, and over a further part of its length passes between plates 3 which may be of aluminium foil bonded to the outside of the chamber walls. The coil and the plates are connected to a high impedance radio frequency power source 4.

Practical equipment will incorporate either the coil 2, or the plates 3. The acompanying drawing is intended to illustrate both alternative arrangements for energizng a plasma, inductively by the coil and capacitively by the plates 3.

Assuming therefore that the coil is to be utilized, a substrate 5, on which the glass layer is to be deposited, is placed in the chamber 1 within the coil 2. The chamber is evacuated via the outlet 6 to a reduced pressure, and into the chamber is introduced, via the inlet 7, a mixture of gaseous or volatile compounds, e.g. the hydrides, of each of the elements required to be present in the deposited layer. Thus, for example, for a glass layer to comprise tellurium, arsenic, germanium and silicon, typically $$Te_{48}As_{30}Ge_{10}Si_{12},$$

the mixture would comprise tellurium hydride, arsine, germane and silane. For $Te_{33}As_{27}Ge_{20}S_{20}$, the mixture would comprise tellurium hydride, arsine, germane, and hydrogen sulphide. For $2As_2Se_3AsTe_3$, the mixture would comprise arsine, selenium hydride and tellurium hydride.

The relative proportions of the compounds forming the mixed atmosphere is determined both by the required formulation for the deposited layer and also by the system geometry and characteristics in respect of power level, frequency, pressure, etc.

Energization of the coil 2 produces a plasma in the low pressure atmosphere in the chamber 1, and the energy necessary to initiate the chemical reactions to dissociate the mixed compounds is obtained from the electric field set up by the coil 2.

Control of the plasma may be effected my magnets 8 which may be permanent magnets or electromagnets. The magnetic field may be such as to concentrate the deposition in a particular area, or to cause the disposition to be spread evenly over the substrate.

Chalcogenide glass layers of graded composition may be deposited by progressively changing the atmosphere constituent compounds and/or the relative proportions thereof during continuous deposition. Stepped layers may be produced by switching off the plasma after a desired thickness of a layer of a first composition has been deposited, flushing the chamber clear of the original atmosphere, re-introducing a new atmosphere, re-energizing to form the plasma, and re-commencing deposition from the new atmosphere. The new atmosphere may comprise the original compounds but in different relative proportions, or may contain one or more new compounds additional to or replacing one or more of the original compounds.

Selective deposition may be obtained by the use of suitable "in-contact" masks. Although the gaseous atmosphere may tend to creep between the underside of the mask and the substrate surface, no deposition occurs under the mask. It is believed that metal masks have the effect of locally inhibiting the action of the plasma and thus preventing deposition under the mask.

In order to obtain chalcogenide glass layers with particular characteristics, it may be necessary to heat the glass layer. This heat treatment may be applied during deposition by substrate heating, or as a subsequent operation in a furnace.

Where any doping of the chalcogenide glass layer is required, for example the addition of oxygen or sulphur, this may readily be achieved, during formation by deposition, by admixture of a suitable gas, e.g. $H_2O$ or $CO_2$ for oxygen doping, to the atmosphere in which the plasma is established.

Although in the above description a radio frequency source is specified, e.g. the frequency is above 10 KHz, lower frequencies may be used including zero frequency, i.e. d.c. At the lower frequencies, electrodes in contact with the atmosphere have to be used to couple in the electric field to establish the plasma. The substrate may be used as one of the electrodes.

It is to be understood that the foregoing description of specific examples of this invention is made by way of example only and is not to be considered as a limitation on its scope.

We claim:

1. A method of depositing a layer of chalcogenide glass on the surface of a substrate from a mixture of gaseous compounds, each of said compounds containing at least one of the chemical elements of said glass comprising the steps of:

(a) introducing a predetermined mixture of said gaseous compounds into a partially evacuated electrodeless discharge reaction chamber having an inlet and outlet;

(b) positioning a substrate material within said reaction chamber intermediate said inlet and said outlet;

(c) exciting an electrodeless glow discharge proximate said substrate whereby said mixture of gaseous compounds becomes energized within said electrodeless discharge and dissociated into the chemical elements of said glass;

(d) directing said chemical elements onto said substrate by magnetic means; and (e) removing gaseous byproducts from the dissociation of said gaseous compounds from the reaction chamber by means of the outlet.

2. A method according to claim 1 wherein each of said compounds is a hydride of the respective element.

3. The method of claim 1 wherein said chalcogenide glass has the composition $Te_{48}As_{30}Ge_{10}Si_{12}$, and said gaseous compounds comprise: tellurium hydride, arsine, germane and silane gas.

4. The method of claim 1 wherein said chalcogenide glass has the composition $Te_{33}As_{27}Ge_{20}S_{20}$, and said gaseous compounds comprise: tellurium hydride, arsine, germane, and hydrogen sulphide.

5. The method of claim 1 wherein said chalcogenide glass has the composition $2As_2Se_3AsTe_3$, and said gaseous compounds comprise: arsine, selenium hydride and tellurium hydride.

6. The method of claim 1 wherein said substrate comprises an electrode for said discharge.

7. The method of claim 1 wherein said gaseous compound further includes compounds of oxygen whereby oxygen is selectively included as a dopant to said chalcognide glass.

8. The method of claim 1 wherein said gaseous compound further includes a compound of sulphur whereby sulphur is added as a dopant to said chalcogenide glass.

9. A method according to claim 1 wherein the substrate comprises a body of semiconductor material whereby said chalcogenide glass elements chemically combine with said substrate during deposition thereon.

10. A method according to claim 2 including the step of heating the substrate during deposition of the layer in order to impart particular characteristics to the resulting chalcogenide glass.

References Cited

UNITED STATES PATENTS

| | | | |
|---|---|---|---|
| 3,024,119 | 3/1962 | Flaschen et al. | 65—Dig 15 |
| 3,419,487 | 12/1968 | Robbins et al. | 117—106 R |
| 3,472,679 | 10/1969 | Ing et al. | 117—93.1 GD |
| 3,657,006 | 4/1972 | Fisher et al. | 117—106 R |

WILLIAM D. MARTIN, Primary Examiner

J. H. NEWSOME, Assistant Examiner

U.S. Cl. X.R.

65—Dig 15; 106—47 R; 117—106 R, 125, 129, 201